ELECTRICAL ENCODING AND DECODING SWITCHING APPARATUS

Filed June 1, 1955

INVENTORS
JOHN J. LENTZ
JOHN H. PALMER
BY
Lippincott & Smith
ATTORNEYS

Nov. 1, 1960 J. J. LENTZ ET AL 2,958,859
ELECTRICAL ENCODING AND DECODING SWITCHING APPARATUS
Filed June 1, 1955 2 Sheets-Sheet 2

INVENTORS
JOHN J. LENTZ
JOHN H. PALMER
BY
Lippincott & Smith
ATTORNEYS

United States Patent Office 2,958,859
Patented Nov. 1, 1960

2,958,859

ELECTRICAL ENCODING AND DECODING SWITCHING APPARATUS

John J. Lentz, Chappaqua, and John H. Palmer, Scarsdale, N.Y., assignors to International Business Machines Corporation, New York, N.Y., a corporation of New York Filed June 1, 1955, Ser. No. 512,363

6 Claims. (Cl. 340—347)

Figure 1:
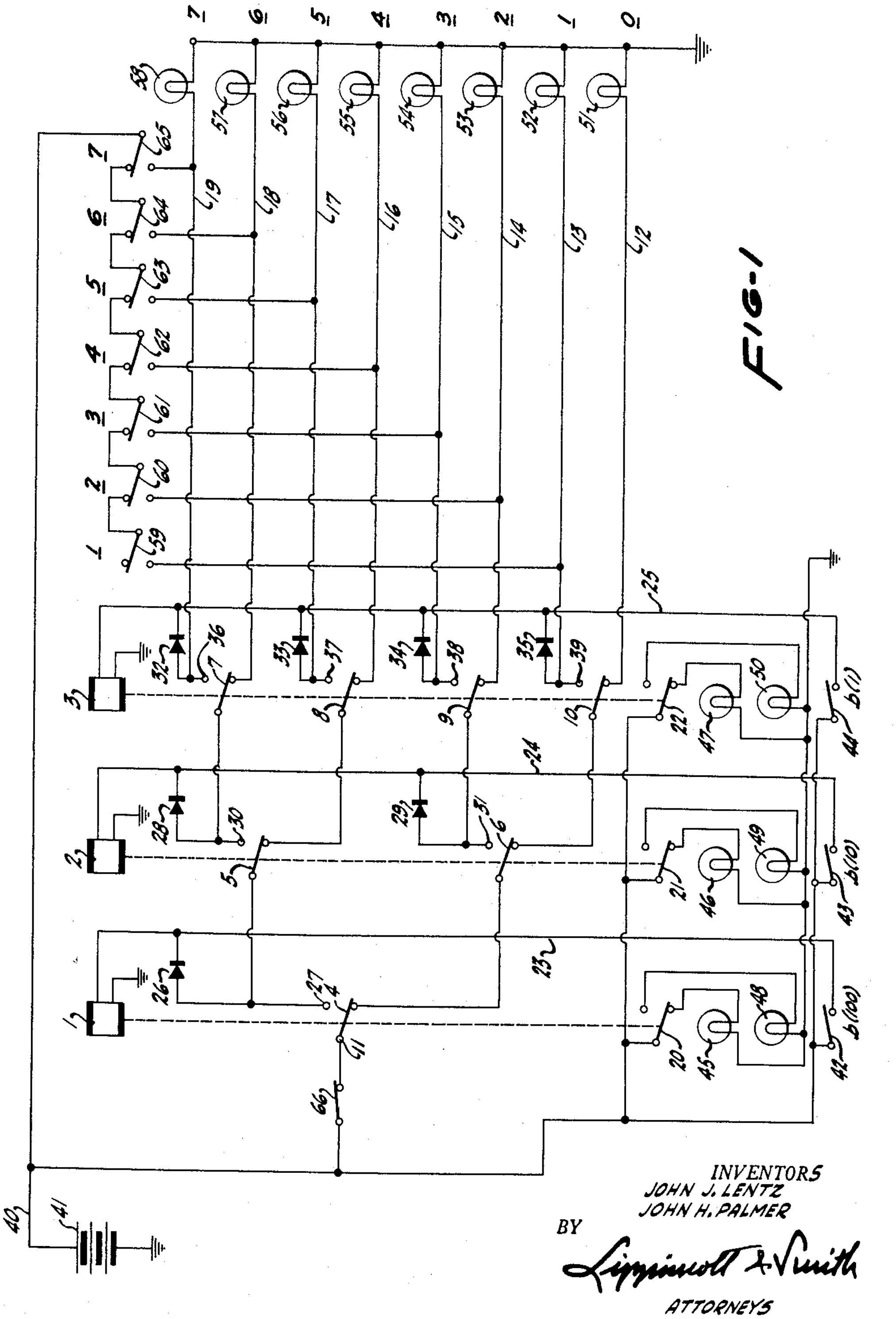

This invention relates to relay operated electrical switching apparatus, and in particular to encoding and decoding apparatus for converting uncoded information into binary coded information and vice versa.

In connection with electronic digital computers and the like, it is often necessary to convert uncoded or other non-binary information into binary coded information, and vice versa. Such information may include numerical data, computing instructions, and programming instructions. For purposes of this application, uncoded information is any information represented by the presence of electric current in any selected one of a plurality of parallel branch circuits, while binary coded information is represented by the simultaneous presence or absence of electric currents in a combination of other parallel circuits. According to this system of binary coding, one circuit or line is generally provided for each numeral of a binary number, and the presence of current in any such line represents a binary bit while the absence of current represents a binary zero.

Heretofore various types of circuit matrices or function tables have been developed for encoding and decoding operations, but generally it has been necessary to employ one matrix for coding and another matrix, usually of a different type, for decoding. This leads to considerable duplication of equipment, not only in the use of two matrices rather than one, but also in associated equipment for supplying information to and receiving information from the matrices. Accordingly, an object of this invention is to provide improved electrical switching apparatus capable of performing both encoding and decoding operations.

In the past, a relay tree has frequently been employed advantageously as a decoding matrix for converting binary coded information into uncoded information. However, the conventional relay tree cannot be employed as an encoding matrix for converting uncoded information into binary coded information, because the relays cannot be energized by signals applied to the output circuit branches. Accordingly, another object of this invention is to provide a relay tree in which the relays can be energized by signals applied to the circuit branches of the tree, and which is suitable for use as an encoding matrix.

Another disadvantage of conventional prior relay trees is that input information signals must be supplied to the relay energizing or select circuits continuously throughout the time interval during which an output signal is desired. Accordingly, still another object of this invention is to provide an improved relay tree in which the relays may be kept energized to supply output signals for any desired length of time after the input signals are interrupted.

Another object of this invention is to provide an improved information storage and programming apparatus for use with digital computers.

Although the present invention is particularly useful in connection with digital computers, electrical switching circuits capable of being controlled bi-directionally from either the input or the output circuits, selectively, may be used advantageously in connection with other electrical apparatus. Accordingly, an object of this invention in its broader aspects is to provide improved electrical switching apparatus adapted for bi-directional control.

Other objects and advantages of the invention will appear as the description proceeds.

Briefly stated, according to one aspect of this invention, a relay tree includes a plurality of relay operated switches arranged for connecting a stem terminal to any one of a plurality of circuit branches, selectively. Each switch has a normally open contact and a normally closed contact, and relay energizing or select circuits are provided for closing selected ones of the normally open contacts and opening corresponding ones of the normally closed contacts. Input binary information is represented by currents supplied to the select circuits, and uncoded or non-binary information is represented by a current supplied to a selected one of the circuit branches of the tree. Thus, by energizing the stem terminal and selected ones of the select circuits, binary coded information is converted into uncoded information. A rectifier is connected between each normally open contact of the circuit tree and the corresponding select circuit so that the tree relays may also be energized by uncoded information input currents supplied through the circuit branches of the tree. Binary information output devices are operated by the relays so that uncoded information supplied to the circuit branches of the tree is converted into binary coded information.

The invention will be better understood from the following description taken in connection with the accompanying drawings, and its scope will be pointed out in the appended claims. In the drawings, Fig. 1 is a circuit diagram of simple encoding and decoding apparatus embodying principles of this invention; and Fig. 2 is a simplified schematic circuit diagram of improved programming apparatus for operating an electronic digital computer.

Figure 2:
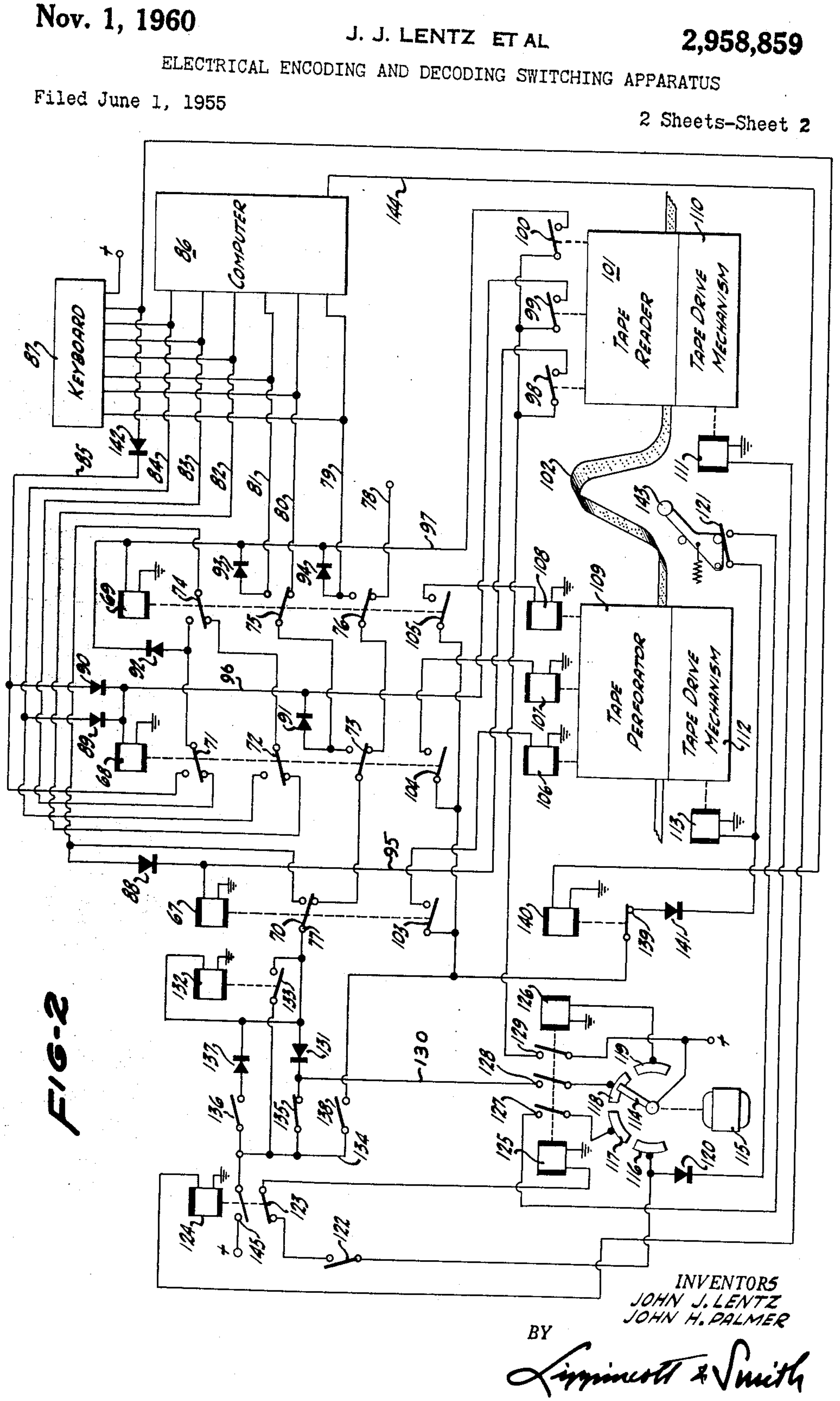

Reference is now made to Fig. 1 of the drawing, which shows a simple encoding and decoding apparatus for converting uncoded information signals into binary coded information signals, and vice versa.

A relay tree includes a plurality of relays 1, 2 and 3 operating respective ones of a plurality of switches represented in the drawing by reference numerals 4, 5, 6, 7, 8, 9 and 10. Each of the switches numbered 4 through 10 has a normally open contact, a normally closed contact, and a common terminal which is connected to the normally closed contact when the associated relay is de-energized, and is connected to the normally open contact when the associated relay is energized. Switches 4 through 10 are connected in a circuit tree for connecting a stem terminal 11 selectively to any one of a plurality of circuit branches 12, 13, 14, 15, 16, 17, 18 and 19. Relays 1, 2 and 3 also operate switches 20, 21 and 22, respectively, which are parts of binary information output means hereinafter described.

Relay energizing or select circuits 23, 24 and 25 are provided for relays 1, 2 and 3, respectively. A rectifier 26 is connected between the normally open contact 27 of switch 4 and select circuit 23 so that relay 1 is energized whenever electric current is supplied to contact 27. Rectifiers 28 and 29 are connected from the normally open contacts 30 and 31 of switches 5 and 6, respectively, to select circuit 24 so that relay 2 is energized whenever electric current is supplied to either of the contacts 30 and 31. Rectifiers 32, 33, 34 and 35 are connected from the normally open contacts 36, 37, 38 and 39 of switches 7, 8, 9 and 10, respectively, to select circuit 25, so that relay 3 is energized whenever electric current is supplied to any one of the contacts 36, 37, 38 and 39. As is well known, rectifiers conduct current readily in one direction only. The rectifiers connected as herein described and illustrated do not short together any of the circuit branches 12–19 because current from any one to any other one of said branches would have to flow in the high-resistance reverse direction through at least one rectifier. For the same reason, substantial current cannot flow from select circuits 23–25 into any of the circuit branches 12–19.

Positive voltage is supplied to lead 40 by any suitable D.-C. electric power supply such as the battery 41. Switches 42, 43 and 44 are connected between lead 40 and the select circuits 23, 24 and 25 respectively, as shown, for supplying electric current through the select circuits to energize selected ones of the relays 1, 2 and 3. When switch 42 is closed, relay 1 is energized and closes the normally open contacts of switches 4 and 20, while the normally closed contacts of the same switches are opened. When switch 43 is closed, relay 2 is energized to close the normally open contacts of switches 5, 6 and 21, while the normally closed contacts of these switches are opened. In the same manner, when switch 44 is closed, relay 3 is energized to close the normally open contacts of switches 7, 8, 9, 10 and 22, and to open the normally closed contacts of the same switches. Switches 42, 43 and 44 are used as binary information input devices, in a manner hereinafter more fully explained.

The binary output switches 20, 21 and 22 may be part of or may control any apparatus responsive to binary coded information, such as binary number display apparatus, recorders, storage devices, or computers. In the embodiment illustrated in Fig. 1, switches 20, 21 and 22 control binary number display apparatus comprising a plurality of incandescent lamps 45, 46, 47, 48, 49 and 50. For example, assume that three input binary zeros are represented by the open condition of switches 42, 43 and 44, respectively, and that three input binary bits or ones are represented by the closed condition of switches 42, 43 and 44, respectively. Three output binary zeros are represented by the illumination of lamps 45, 46 and 47, respectively, while three output binary bits or ones are represented by the illumination of lamps 48, 49 and 50. Switch 42 and lamps 45 and 48 may represent the left-hand numeral of a three-place binary number, switch 43 and lamps 46 and 49 may represent the center numeral of a three-place binary number, and switch 44 and lamps 47 and 50 may represent the right-hand numeral of a three-place binary number. For convenience, binary numbers are herein identified by enclosing the number in parenthesis preceded by the letter *b*. Thus the binary number *b*(101) is represented by closing switches 42 and 44 and by the illumination of lamps 48, 46 and 50.

Uncoded or non-binary information is represented by electric current in a selected one of the circuit branches 12 through 19, which illuminates a corresponding one of the incandescent lamps 51, 52, 53, 54, 55, 56, 57 and 58, or operates other apparatus responsive to uncoded information such as number display, recording, storage or computing apparatus. Uncoded information is herein identified by a selected one of the underscored numerals 0 through 7, inclusive. Input uncoded information is supplied by switches 59, 60, 61, 62, 63, 64 and 65 connected in series to lead 40 through normally closed contacts of the switches, as shown. Normally open contacts of switches 59 through 65 are connected to respective ones of circuit branches 13 through 19, so that whenever a selected one of the switches 59 through 65 is depressed, electric current is supplied to a selected one of the circuit branches 13 through 19.

Stem terminal 11 of the relay tree is connected to lead 40 through a normally closed switch 66, the functions of which will become apparent as the description proceeds.

Assume that all of the switches are initially in the position shown in Fig. 1, which is the condition prevailing when the three relays 1, 2 and 3 are de-energized. Current is supplied through switches 66, 4, 6 and 10 to circuit branch 12, so that lamp 51 is illuminated to represent the uncoded information value 0. Current is also supplied through switch 20 to illuminate lamp 45, through switch 21 to illuminate lamp 46, and through switch 22 to illuminate lamp 47, thus representing the binary number *b*(000).

Now assume that switch 65 is depressed, for an input of uncoded information 7. This supplies electric current to circuit branch 19 and lamp 58 is illuminated. Current also flows through rectifier 32 to select circuit 25, and relay 3 is energized to close the normally open contacts of switches 7, 8, 9 and 10, while the normally closed contacts of the same switches are opened. Lamp 51 is now extinguished, and current flows through contact 36 of switch 7 and through rectifier 28 to select circuit 24, whereupon relay 2 is energized to close the normally open contacts of switches 5 and 6 and to open the normally closed contacts of these switches. Current now flows through contact 30 of switch 5 and rectifier 26 to select circuit 23, whereupon relay 1 is energized to close the normally open contact of switch 4 and to open the normally closed contact of that switch. The action of relays 1, 2 and 3 preferably is quite rapid, so that the relays are quickly set up when an input switch is depressed.

As relays 1, 2 and 3 are energized, switches 20, 21 and 22 are operated to close the normally open contacts and to open the normally closed contacts of these switches. This extinguishes lamps 45, 46 and 47 and illuminates lamps 48, 49 and 50. Thus, lamps 48, 49 and 50 now indicate the binary number *b*(111), which corresponds to the uncoded information 7. In this way uncoded information is automatically converted into binary coded information.

When switch 65 is released, thus breaking the supply circuit through the uncoded information input switches, relays 1, 2 and 3 are held in their energized condition by current through switch 66. Current to keep relay 1 energized is supplied to select circuit 23 through switch 66, contact 27 of switch 4, and rectifier 26. Current to keep relay 2 energized is supplied to select circuit 24 from contact 27 through contact 30 of switch 5 and rectifier 28. Current to keep relay 3 energized is supplied to select circuit 25 from contact 30 through contact 36 of switch 7 and rectifier 32. Consequently, lamps 48, 49, 50 and 58 remain illuminated to indicate that the input information last received was 7 or *b*(111).

To reset the circuit to zero, switch 66 is opened momentarily, whereupon all of the relays drop out and the switches return to their initial positions. In a manner similar to that hereinbefore described, whenever any one of the switches 59 through 65 is depressed the appropriate relays pick up and the appropriate lamps are illuminated to indicate the uncoded and the binary coded values of the input information.

Input binary information is supplied by closing appropriate ones of the binary input switches 42, 43 and 44. Thus supplies current directly to the select circuits for energizing appropriate ones of the relays 1, 2 and 3, whereupon the binary value of the input information is indicated by lamps 45 through 50 and the uncoded value of the input information is indicated by lamps 51 through 58. Once the relays are set up, they are held in their energized conditions by current through switch 66 in the manner hereinbefore explained, so that the input information is retained until switch 66 is opened to clear the circuit. In this way, binary information is automatically converted into uncoded information.

The bi-directional control characteristics of the novel relay tree make it especially useful as an encoding and decoding matrix, since a single tree can be used for both purposes. The novel relay tree is also useful for other purposes, including many types of electrical switching operations. The relay holding characteristics provided by switch 66 in the manner hereinbefore explained makes possible use of the novel circuit as a memory or storage unit to retain information for any desired length of time.

Although the circuits illustrated have eight uncoded information circuits and three binary information circuits, it will be understood that the three can be expanded to provide any desired number of information circuits. In general, an additional relay and select circuit will be added for each additional binary information circuit desired, and each such addition will double the number of available uncoded information circuits; but of course it is not necessary to actually utilize all of the circuits provided. Also, it will be understood that the information to be encoded or decoded need not necessarily represent numerical data, since any information capable of expression in binary number form can be processed. In computer apparatus, such information may include mathematical instructions, programming instructions, and the like, as is well known to those skilled in the computer art. The circuit can be operated with a negative supply voltage in place of the positive supply voltage provided by battery 41, if all of the rectifiers in the circuit are reversed to transmit current in the opposite direction. Under the same conditions, connections to the supply voltage and to ground can be interchanged throughout the circuit, it being understood that ground is used as one of the voltage supply terminals merely as a matter of convenience. Where one relay operates a plurality of contacts, the same results can be obtained with a plurality of relays connected in parallel. Furthermore, the relay tree can be rearranged to "equalize" the number of switch operated by each relay, except relay 1, in a manner known to those skilled in the art and heretofore employed with conventional relay trees.

Reference is now made to Fig. 2 which shows a computer input and programming circuit embodying principles of this invention. Relays 67, 68 and 69 operate respective ones of switches 70, 71, 72, 73, 74, 75 and 76 connected in a circuit tree which is similar in function to the circuit tree disclosed in Fig. 1, but which has been rearranged to equalize the number of switches operated by relays 68 and 69. The relay tree shown in Fig. 2 connects stem terminal 77 to any one of a plurality of circuit branches 78, 79, 80, 81, 82, 83, 84 and 85, selectively. Circuits 79 through 84 are both input and output circuits for an electronic digital computer 86, through which the computer receives input data and instructions, and supplies output information. Circuits 78 and 85 are not connected to the computers, since these circuits are used for "blank" and "error" information in a manner hereinafter more fully explained. In this embodiment, computer 86 is of a type which receives non-binary or "uncoded" information: hence the computer is connected to the uncoded information circuits of the relay tree. Although only six circuits to the computer are shown in Fig. 2, it will be understood that any number of such circuits may be provided by expanding the relay tree in the manner hereinbefore explained.

A keyboard 87 is provided for supplying information directly to computer 86 and for other purposes hereinafter explained. Keyboard 87 has a plurality of conventional manually operated keys, not shown, respectively connected to a plurality of switches similar to the input switches 59–65 shown in Fig. 1. The normally open contacts of these switches are connected to respective ones of the circuit branches 79 through 85, so that operation of a keyboard key supplies electric current to a selected one of the branch circuits.

In the relay tree, a plurality of rectifiers 88, 89, 90, 91, 92, 93 and 94 are respectively connected between each normally open contact of the relay tree switches and corresponding ones of the relay energizing or select circuits 95, 96 and 97, so that when electric current is supplied to any one of the normally open contacts of the relay tree, the associated relay is energized to close the normally open contacts and to open the normally closed contacts of the switches which it operates. Consequently, when current is supplied to any one of the circuit branches 79 through 85, appropriate ones of the relays 67, 68 and 69 are picked up in the manner hereinbefore explained so that the circuit tree automatically connects stem terminal 77 to the energized circuit branch. Current for energizing appropriate ones of the relays can also be supplied to the select circuits by switches 98, 99 and 100, which are binary information input switches having a purpose similar to that of switches 20, 21 and 22 of Fig. 1. However, in the embodiment illustrated in Fig. 2, switches 98, 99 and 100 are operated by a tape reader 101 in accordance with perforations previously punched in a paper tape 102.

Relays 67, 68 and 69 also operate switches 103, 104 and 105, respectively, which supply current to solenoids 106, 107 and 108 associated with the punch mechanism of a tape perforator 109. In this way output binary information from the relay tree is recorded in the form of perforations in tape 102, from which it may subsequently be read by tape reader 101 or utilized in any other desired manner. Tape reader 101 and perforator 109 are substantially conventional devices, the details of which form no part in the present invention. However, it should be noted that a tape drive mechanism 110 advances tape 102 by one unit distance with respect to tape reader 101 each time that a tape advance solenoid 111 is energized. Similarly, a tape drive mechanism 112 advances tape 102 by one unit distance with respect to tape perforator 109 each time that a tape advance solenoid 113 is energized.

Timing pulses for the tape reader are generated by a distributor switch 114 continuously driven by an electric motor 115, or by an equivalent arrangement such as a plurality of cam-actuated circuit breakers. As switch 114 is rotated, electric current from a suitable source (not shown) is supplied successively to switch segments 116, 117, 118 and 119. Segment 116 is connected through a rectifier 120 and a normally open switch 121 to tape advance solenoid 113, and is connected through a switch 122 and normally closed contacts 123 of a relay 124 to the pick-up coil 125 of a two-position or latching-type relay having a drop-out coil 126 connected to distributor switch segment 119, as shown. When the pick-up coil 125 is energized, normally open contacts 127, 128 and 129 are closed and remain closed until drop-out coil 126 is energized, whereupon the latching relay contacts return to their initial positions.

When contact 127 is closed, a circuit is completed between switch segment 117 and tape advance solenoid 111. When contact 128 is closed, a circuit is completed between switch segment 118 and a lead 130, for purposes hereinafter described. When contact 129 is closed, the electric supply is connected to switches 98, 99 and 110.

Stem terminal 77 of the relay tree is connected to the lead 130 through a rectifier 131, and is also connected to a relay 132 which operates a normally open switch 133 connected between stem terminal 77 and a lead 134. Lead 134 is connected to lead 130 through a normally closed switch 135, and is connected to stem terminal 77 through a switch 136 and a rectifier 137. Lead 134 is also connected through a switch 138, a normally closed contact 139 of a relay 140, and a rectifier 141, to tape advance solenoid 113. Relay 140 is connected to the error key of keyboard 87, and is isolated from circuit branch 85 by a rectifier 142.

Switch 121 is operated by a lever 143 responsive to the amount of tape 102 in the loop between the tape perforator and the tape reader. When the tape loop becomes too small, lever 143 closes switch 121, which causes tape drive mechanism 112 to feed blank tape through the perforator, in a manner hereinafter more fully explained, so that the tape will not be torn when the tape reader is operating and the tape perforator is not. Switch 122 is closed whenever it is desired that information should be read from tape 102 by tape reader 101, and is open when operation of tape reader 101 is not desired. Switch 122 may be manually operated; or alternatively, it may be controlled automatically through relays (not shown) operated by programming instructions supplied through selected ones of the circuit branches 79–84.

If desired, switch 135 may be replaced by a code-checking mechanism (not shown) which opens the circuit at switch 135 whenever the information supplied by tape reader 101 is obviously erroneous. This can be accomplished by the use of self-checking codes in a manner well known to those skilled in the computer art. Switch 136 is closed whenever it is desired that information supplied by the tape reader 101 should control the computer 86, and is open at other times—for example, that when it is desired that information supplied by the tape reader should merely be re-entered on tape 102 by tape perforator 109. Switch 138 is closed whenever it is desired that information be perforated on the tape by tape perforator 109, and is open at other times.

The apparatus illustrated in Fig. 2 may be operated in several different ways at the discretion of the operator. With the switches in the positions shown in the drawing, computer 86 is controlled solely by input information supplied by keyboard 87, which may include numerical data and operating instructions. Since the input circuits of computer 86 and the keyboard 87 are arranged to operate with the same "uncoded" or non-binary type of information, the keyboard switches are connected directly to the computer input circuits as shown.

Whenever the operator desires that information supplied by keyboard 87 should be converted to binary form and entered on tape 102, the operator closes switch 138 to complete the electrical circuits which control tape perforator 109. Now assume that a keyboard key is depressed to supply electric current to circuit branch 83. This current passes through switch 71 and rectifier 92 to pick up relay 69, and then passes through switch 74 and rectifier 88 to pick up relay 67. The relays now close switches 103 and 105 to convert the input information into binary coded form.

Also, current is supplied through switch 70 which picks up relay 132 so that the current now passes through switch 133 to lead 134. From lead 134 current passes through the closed switch 138, relay contact 139 and rectifier 141 to energize tape advance solenoid 113 which operates tape drive mechanism 112 to advance the tape 102 by one unit distance relative to tape perforator 109. Current from lead 134 also passes through the closed switches 138, 103 and 105 to energize the tape punch solenoids 106 and 108, whereupon these solenoids operate to punch holes in two of the three parallel information channels of tape 102. Preferably, the tape drive mechanism operates faster than the tape punch mechanism, so that the tape is advanced before the holes are punched. In this way information from the keyboard is converted into binary form and recorded by means of perforations punched into tape 102. As soon as the key of keyboard 87 is released, the relays are de-energized and the relay operated switches return to their initial positions.

If the operator desires that information previously recorded on tape 102 should be read by tape reader 101 and used to control computer 86, switches 122 and 136 are closed. When the rotating distributor switch 114 next contacts segment 116, current flows through switches 122 and 123 to energize pick-up coil 125 of the latching relay. This closes contacts 127, 128 and 129, and connects switches 98, 99 and 100 to the electric supply.

When switch 114 contacts segment 117, current is supplied through contact 127 which energizes tape advance solenoid 111 and operates tape drive mechanism 110 to advance tape 102 one unit distance relative to tape reader 101. The tape is now in position for reading information.

Assume that the number recorded on this portion of the tape is $b(101)$, represented by holes punched in the first and third information channels of the tape. Tape reader 101 closes switches 98 and 100, and current now passes through these switches to energize relays 67 and 69. Switch 114 next contacts segment 118, and current passes through contact 128 to lead 130. If switch 135 is closed, this current passes through to lead 134 and from there through switch 136 and rectifier 137 to stem terminal 77 of the relay tree. Since relays 67 and 69 are energized, the relay tree transmits current from stem terminal 77 to circuit branch 83 and thence to computer 86.

At this point, current through rectifiers 88 and 92 will keep relays 67 and 69 energized, even though the circuits through switches 98 and 100 may be interrupted for any reason. Switch 114 now contacts segment 119 and supplies current to energize the drop-out coil 126 of the latching relay, whereupon the latching relay contacts 127, 128 and 129 are opened. If switch 122 is still closed when switch 114 again contacts segment 116, the reading operation will be repeated to read the information stored at the next position on tape 102, to decode this information and to supply the uncoded information to the appropriate input circuit of computer 86.

In computer programming, it is often necessary that a given sequence of information or instructions should be repeated one or more times. It is desirable to provide automatic means for repeating such sequences of instructions, so that the operator will not have to supply the same set of instructions over and over again through the keyboard. In the present apparatus, this repetition or echoing of a sequence of instructions is accomplished by having tape perforator 109 re-enter on tape 102 the information read from the tape by tape reader 101.

To operate the apparatus in this manner, switches 122 and 138 are both closed. Tape reader 101 operates in the manner hereinbefore explained and energizes selected ones of the relays 67, 68 and 69 in accordance with the information read from the tape. The relays close corresponding ones of the switches 103, 104 and 105, and current is supplied to these switches through lead 130 and switches 135 and 138 each time that the distributor switch 114 contacts segment 118. Responsive to these currents, appropriate ones of the punch solenoids 106, 107 and 108 are energized, and tape perforator 109 operates in a manner hereinbefore explained to re-perforate on tape 102 the information read by tape reader 101. Since tape 102 travels through the tape perforator and the tape reader successively, the reperforated information is read by the reader at some later time. In this way, any sequence of instructions or other information can be repeated as many times as may be desired.

The amount of information which may be stored between tape perforator 109 and tape reader 101 depends upon the size of the loop in tape 102 between the tape perforator and the tape reader. Since either the tape reader or the tape perforator may be operated independently of the other, the size of this loop, and hence the amount of information storage space provided, is variable. This is advantageous since information sequences of varying length can be stored on the tape without the loss of operating time which would result if the length of tape between the perforator and the reader were constant so that short sequences would be separated by long lengths of blank tape. If the tape loop becomes too small, so that there is danger of tearing the tape, the tape depresses lever 143 and closes switch 121. Then each time that distributor switch 114 contacts segment 116, current is supplied through rectifier 120 and switch 121 to tape advance solenoid 113, so that a sufficient amount of blank tape is fed through the tape perforator by tape drive mechanism 112 to prevent tearing of the tape. Since blank or unpunched tape represents a mere absence of information, circuit branch 78, which is energized by the tape reader when there are no holes punched in the tape, is a dead-end circuit which is not connected to the computer 86.

Circuit branch 85, which is energized by tape reader 101 when holes are punched in all three channels of the tape, may conveniently be used as an error indication, and accordingly this circuit branch also is not connected to computer 86. It is, however, connected to keyboard 87, so that an error key may be provided on the keyboard which will operate tape perforator 109 to punch holes in all three channels of the tape and thus indicate that an error has been made. The error key of keyboard 87 is connected to relay 140, so that when the error key is depressed, contact 139 opens and tape advance solenoid 113 is not energized. Accordingly, the tape is not advanced when the error key is depressed, and the error indication is simply punched over the information previously entered on tape 102 during the preceding keyboard operation. To prevent the loss of information when perforator 109 is reperforating information read by the reader 101, the error key is preferably isolated from circuit branch 85 by a rectifier 142, as shown. Alternatively, a blank and error signal rejector circuit may be inserted at switch 135 so that blank tape and errors will not operate tape perforator 109 during reperforation programs.

In some cases, the time required for computer 86 to complete a long arithmetic operation may exceed the normal interval between successive operations of tape reader 101. To prevent the tape reader from supplying additional information before the computer is ready to receive it, relay 124 is connected to the computer through a line 144 which is energized by the computer while the computer is performing arithmetic operations. When relay 124 is energized, it opens switch 123. Accordingly, if the computer has not completed the preceding operation by the time the distributor switch 114 reaches segment 116, the circuit to pick-up coil 125 will be broken at switch 123, and the latching relay will not pick up during that cycle of switch 114. As a result, tape reader 101 will skip one or more reading cycles until computer 86 is again ready to receive information. While relay 124 is energized, current from the electric supply is provided through the normally open contact 145 to stem terminal 77 of the relay tree, and the input signal to computer 86 is thus maintained until each computer operation is complete.

It will be understood that this invention is not limited to specific embodiments herein illustrated and described, and that the following claims are intended to cover all changes and modifications which do not depart from the true spirit and scope of the invention.

What is claimed is:

1. Electrical switching apparatus comprising a D.C. voltage source, a relay having a normally open contact and a winding, a select circuit independent of said contact for connecting said winding to said source at selected times for energizing said relay to close said normally open contact, means separate from said winding for connecting said contact to said source at selected times for supplying electric current to said contact independent of the operation of said relay, and a rectifier connected between said normally open contact and said select circuit, said rectifier being poled to conduct current supplied by said last-mentioned means from said contact to said winding and not to conduct current supplied by said select circuit to said contact so that current supplied to said contact energizes said relay, whereby said relay automatically closes said normally open contact responsive to current supplied to said contact.

2. Electrical switching apparatus comprising a D.C. voltage source, a relay having a normally open contact and a winding, a select circuit independent of said contact for connecting said winding to said source at selected times for energizing said relay to close said normally open contact, a terminal connected to said normally open contact only when said relay is energized, a rectifier connected to transmit electric current unidirectionally between said normally open contact and said select circuit, means separate from said winding for connecting said contact to said source at selected times for supplying current through said normally open contact and said rectifier to energize said relay, and means for supplying current through said terminal to hold said relay in the energized state.

3. Electrical switching apparatus comprising a relay having a normally open contact and a normally closed contact, a select circuit for energizing said relay to close said normally open contact and to open said normally closed contact, a terminal connected selectively by operation of said relay to whichever one of said contacts is then closed, means independent of said terminal for supplying current to either of said contacts selectively, and a rectifier connected to transmit electric current between said normally open contact and said select circuit so that said relay is energized whenever current is supplied to said normally open contact, whereby current supplied to either of said contacts is transmitted to said terminal.

4. Electrical switching apparatus comprising a plurality of relays operating a plurality of switches, each of said switches having a terminal connected to a normally closed contact or a normally open contact selectively by operation of its relay, said switches being arranged in a circuit tree for connecting a stem terminal to any one of a plurality of circuit branches selectively, a plurality of select circuits for energizing respective one of said relays, and a plurality of rectifiers respectively connected between each of said normally open contacts and the select circuit of its relay.

5. Electrical encoding apparatus for converting uncoded information into binary coded information, comprising first, second and third switches each having a common terminal connected by operation of the switch to a normally closed contact or to a normally open contact selectively, the common terminals of said second and third switches being respectively connected to said normally open contact and to said normally closed contact of the first switch, four branch circuits respectively connected to said four contacts of the second and third switches, first relay means including a first select circuit for operating said first switch, second relay means including a second select circuit for operating said second and third switches, a first rectifier connected between said normally open contact of the first switch and said first select circuit, second and third rectifiers respectively connected between said normally open contacts of the second and third switches and said second select circuit, uncoded information input means operable to supply electric current to any one of said four branch circuits selectively, and digital information output means operated by said first and second relay means.

6. Electrical encoding and decoding apparatus comprising a plurality of relays operating a plurality of switches, each of said switches having a terminal connected to a normally closed contact or to a normally open contact selectively by operation of its relay, said switches being arranged in a circuit tree for connecting a stem terminal to any one of a plurality of circuit branches selectively, a plurality of select circuits for energizing respective ones of said relays, a plurality of rectifiers respectively connecting each of said normally open contacts to the select circuit of its relay, means for supplying electric current to said stem terminal, uncoded information input switches operable to supply electric current to any one of said circuit branches selectively, uncoded information output means operated by currents supplied to said circuit branches, digital information input switches operable to supply electric current to respective ones of said select circuits, and digital information output means operated by said relays.

References Cited in the file of this patent

UNITED STATES PATENTS

| | | |
|---|---|---|
| 876,701 | Drewell | Jan. 14, 1908 |
| 2,330,505 | Matthias | Sept. 28, 1943 |
| 2,369,474 | Luhn | Feb. 13, 1945 |
| 2,563,824 | Dunlap et al. | Aug. 14, 1951 |

OTHER REFERENCES

"Rectifier Networks for Multiposition Switching," Proc. of the I.R.E., February 1949, pp. 139–147 (p. 139 relied on).